United States Patent
Sun et al.

(10) Patent No.: US 8,961,042 B2
(45) Date of Patent: Feb. 24, 2015

(54) OPTICAL COUPLING DEVICE

(71) Applicants: Sintai Optical (Shenzhen) Co., Ltd., Shenzhen (CN); Asia Optical International Ltd., Road Town (GB)

(72) Inventors: Chia-Tse Sun, Taichung (TW); Bing-Hung Shih, Taichung (TW); Guo-Shuen Huang, Taichung (TW); Chia-Jan Lee, Taichung (TW)

(73) Assignees: Sintai Optical (Shenzhen) Co., Ltd., Shenzhen (CN); Asia Optical International Ltd., Tortola (VG)

( * ) Notice: Subject to any disclaimer, the term of this patent is extended or adjusted under 35 U.S.C. 154(b) by 92 days.

(21) Appl. No.: 13/803,898

(22) Filed: Mar. 14, 2013

(65) Prior Publication Data
US 2014/0099057 A1    Apr. 10, 2014

(30) Foreign Application Priority Data
Oct. 5, 2012   (TW) .............................. 101136971 A

(51) Int. Cl.
*G02B 6/36* (2006.01)
*G02B 6/32* (2006.01)
*G02B 6/42* (2006.01)

(52) U.S. Cl.
CPC ................ *G02B 6/32* (2013.01); *G02B 6/4204* (2013.01); *G02B 6/4214* (2013.01); *G02B 6/423* (2013.01); *G02B 6/4249* (2013.01); *G02B 6/4231* (2013.01)
USPC ............................................................. 385/93

(58) Field of Classification Search
USPC ...................................................... 385/88–93
See application file for complete search history.

(56) References Cited

U.S. PATENT DOCUMENTS

| | | | | |
|---|---|---|---|---|
| 6,234,687 | B1 * | 5/2001 | Hall et al. ........................ | 385/88 |
| 6,832,028 | B2 * | 12/2004 | Gu et al. .......................... | 385/41 |
| 6,913,400 | B2 * | 7/2005 | O'Toole et al. ................. | 385/89 |
| 7,369,328 | B2 | 5/2008 | Yamamoto et al. | |
| 2002/0064347 | A1 * | 5/2002 | Mertz et al. ...................... | 385/52 |
| 2006/0239605 | A1 * | 10/2006 | Palen et al. ...................... | 385/14 |
| 2012/0061693 | A1 * | 3/2012 | Sherrer et al. ................... | 257/88 |

* cited by examiner

*Primary Examiner* — Eric Wong
(74) *Attorney, Agent, or Firm* — Ming Chow; Sinorica, LLC

(57) ABSTRACT

An optical coupling device includes an optical coupling member, an optical-electrical converting module, and at least two optical fibers. The optical coupling member has a first under positioning portion. The optical-electrical converting module has a substrate, a base, an optical signal transmitter, and an optical signal receiver. The base is made of an insulating material and is provided on the substrate. The base has a receiving portion and a second under positioning portion to engage the first under positioning portion. The optical signal transmitter and the optical signal receiver are receiving in the receiving portion and face the first lens portion when the second under positioning portion engages the first under positioning portion. The optical fibers are beside the optical coupling member and face the second lens portion.

15 Claims, 9 Drawing Sheets

OPTICAL COUPLING DEVICE

The current application claims a foreign priority to the patent application of Taiwan No. 101136971 filed on Oct. 5, 2012.

BACKGROUND OF THE INVENTION

1. Field of the Invention

The present invention relates generally to an optical device, and an optical coupling device.

2. Description of the Related Art

As the improvement of technology, more and more designs and devices transmit data through optical signals, and the most popular device in optical transmission is optical coupling device.

U.S. Pat. No. 7,369,328 taught an optical path change type optical coupling element, in which an optical coupling member is provided between two optical connectors. The optical coupling member is provided with two lens portions on opposite sides thereof. These two lens portions have the same distance to a reflective face. The character of the optical signal is changed in the lens portions therefore there is a low loss and high coupling efficiency in optical coupling transmission through the optical coupling element.

In assembly of such optical coupling element, it has to precisely align the lens portions of the optical coupling member with the optical connectors by labor or by machine. The alignment task takes a long time, and, sometime, it can't obtain a precise alignment. Therefore, the conventional optical coupling device still needs to be improved.

SUMMARY OF THE INVENTION

The primary objective of the present invention is to provide an optical coupling device, which takes a short time in an optical alignment task and has a precise optical alignment.

According to the objective of the present invention, the present invention provides an optical coupling device, including an optical coupling member, an optical-electrical converting module, and at least an optical fiber. The optical coupling member has at least a lens portion, a reflective face, and a first under positioning portion. An optical signal transmits into the optical coupling member via the lens portion, and then is reflected by the reflective face to leave the optical coupling member, or an optical signal transmits into the optical coupling member, and then is reflected by the reflective face to leave the optical coupling member via the lens portion. The optical-electrical converting module is beside the optical coupling member and has a substrate, a base, and an optical-electrical converter. The base is made of an insulating material and is provided on the substrate. The base has a receiving portion and a second under positioning portion. The optical-electrical converter is received in the receiving portion of the base to receive an electrical signal and convert the electrical signal into an optical signal, or receive an optical signal and convert the optical signal into an electrical signal. The second under positioning portion engages the first under positioning portion of the optical coupling member to connect the optical-electrical converting module to the optical coupling member and make the optical-electrical converter face the optical coupling member. The optical fiber has an end facing the optical coupling member. The optical coupling member is between the optical-electrical converting module and the optical fiber. The optical fiber transmits an optical signal from outside to the optical coupling member, or receives an optical signal from the optical coupling member and transmits the optical signal to outside.

In an embodiment, the first under positioning portion has two holes at opposite sides of the first lens portion; the second under positioning portion has two protrusions, which are complementary to the holes, at opposite sides of the receiving portion to engage the holes.

In an embodiment, at least an inner sidewall of the receiving portion is on a plane which contains both central axes of the protrusions.

In an embodiment, the lens portion of the optical coupling member has a first lens portion and a second lens portion; the first lens portion is at a side of the optical coupling member which faces the optical-electrical converting module; the first under positioning portion and the first lens portion are on the same side; and the second lens portion is at a side of the optical coupling member which faces the optical fiber.

In an embodiment, the optical-electrical converter of the optical-electrical converting module has an optical signal transmitter and an optical signal receiver; the optical signal transmitter has at least a light emitting portion; the optical signal transmitter receives the electrical signal and converts the electrical signal into the optical signal, and then emits the optical signal out via the light emitting portion; the optical signal receiver at least a light receiving portion; the optical signal receiver receives the optical signal via the light receiving portion, and then converts the optical signal into the electrical signal and transmits the electrical signal out; and the optical fiber has at least a first optical fiber for receiving the optical signal from outside and transmitting the optical signal to the optical coupling member and at least a second optical fiber for receiving the optical signal from the optical coupling member and transmitting the optical signal to outside.

In an embodiment, the receiving portion of the base has a first receiving hole, in which the optical signal transmitter is received, and a second receiving hole in which the optical signal receiver is received.

In an embodiment, a distance between a middle axis of the first receiving hole and a central axis of the adjacent protrusion is equal to a distance between a middle axis of the second receiving hole and a central axis of the adjacent protrusion.

In an embodiment, the substrate has a plurality of pads to be electrically connected to the optical-electrical converter.

In an embodiment, the substrate is a printed circuit board, on which a conductor pattern is provided, and the optical-electrical converter is electrically connected to the conductor pattern.

In an embodiment, the printed circuit board is a rigid-flex printed circuit board, and the conductor pattern is embedded in the rigid-flex printed circuit board.

In an embodiment, the optical signal transmitter is a vertical cavity surface emitting laser (VCSEL), and the optical signal receiver is a photodiode (PD).

In an embodiment, both the light emitting portion of the optical signal transmitter and the light receiving portion of the optical signal receiver face the first lens portion when the second under positioning portion engages the first under positioning portion.

Therefore, with the design of the present invention, the optical coupling device has a short time for optical alignment and high precision of optical positioning.

DETAILED DESCRIPTION OF THE INVENTION

Figure 1:
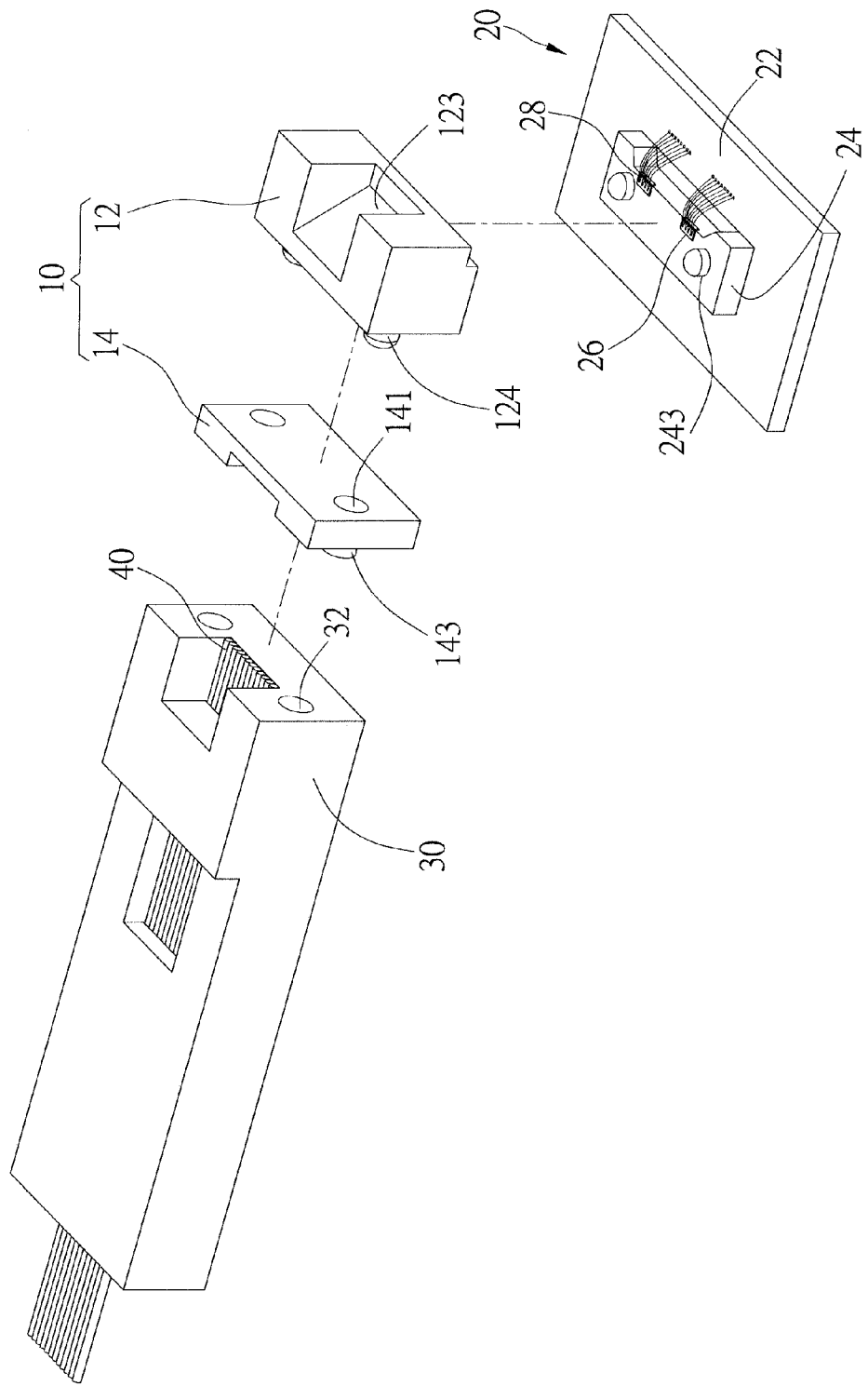
FIG. 1 is an exploded view of a preferred embodiment of the present invention.
Figure 2:
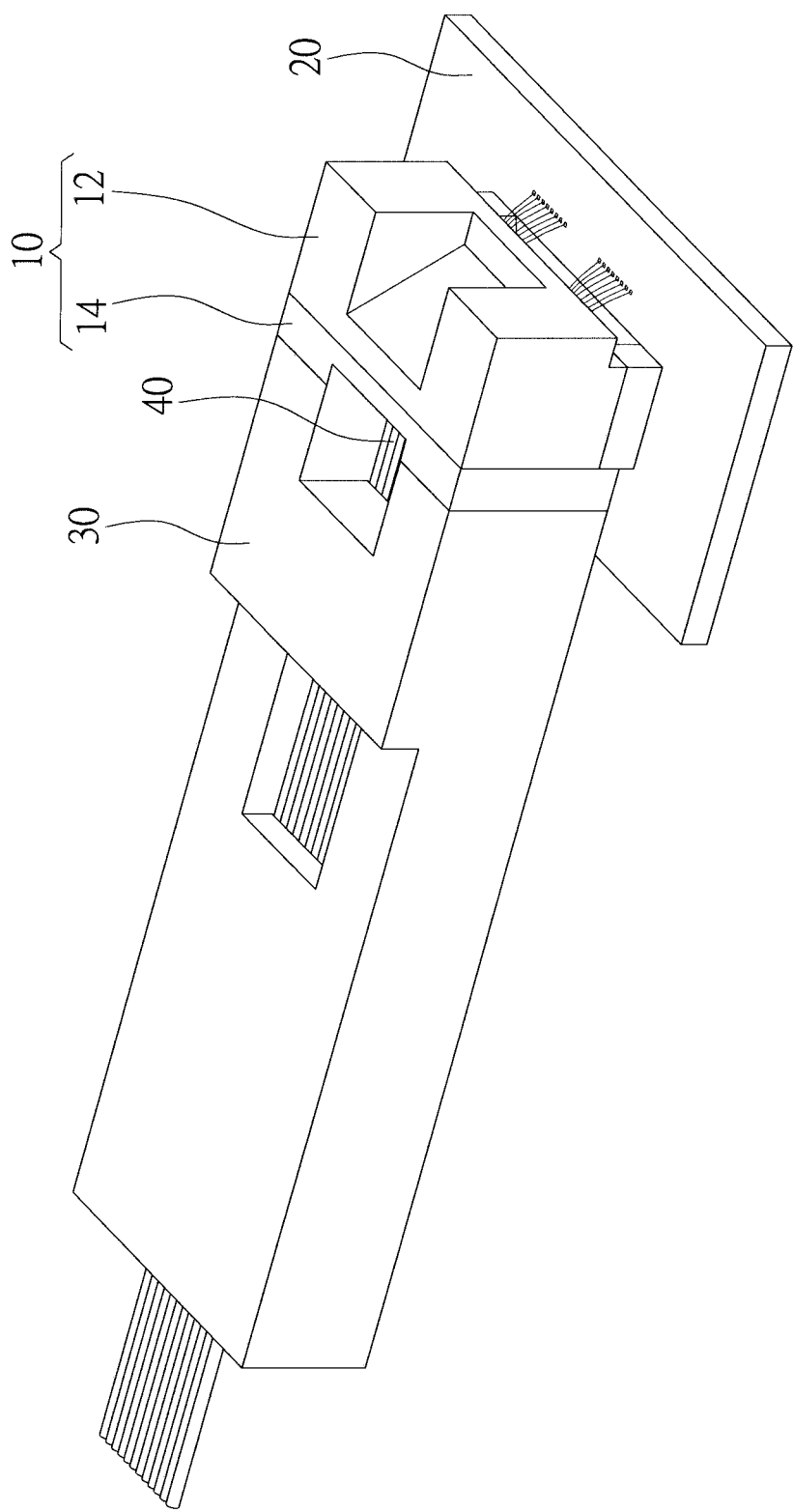
FIG. 2 is a perspective view of the preferred embodiment of the present invention.

As shown in FIG. 1 and FIG. 2, an optical coupling device of the preferred embodiment of the present invention is applied to a 4-transmitter/4-receiver transceiver and a MT connector. The optical coupling device includes an optical coupling member 10, an optical-electrical converting module 20, a wire frame 30, and several optical fibers 40.

The optical coupling member 10 has a main body 12 and a lens frame 14, wherein

Figure 3:
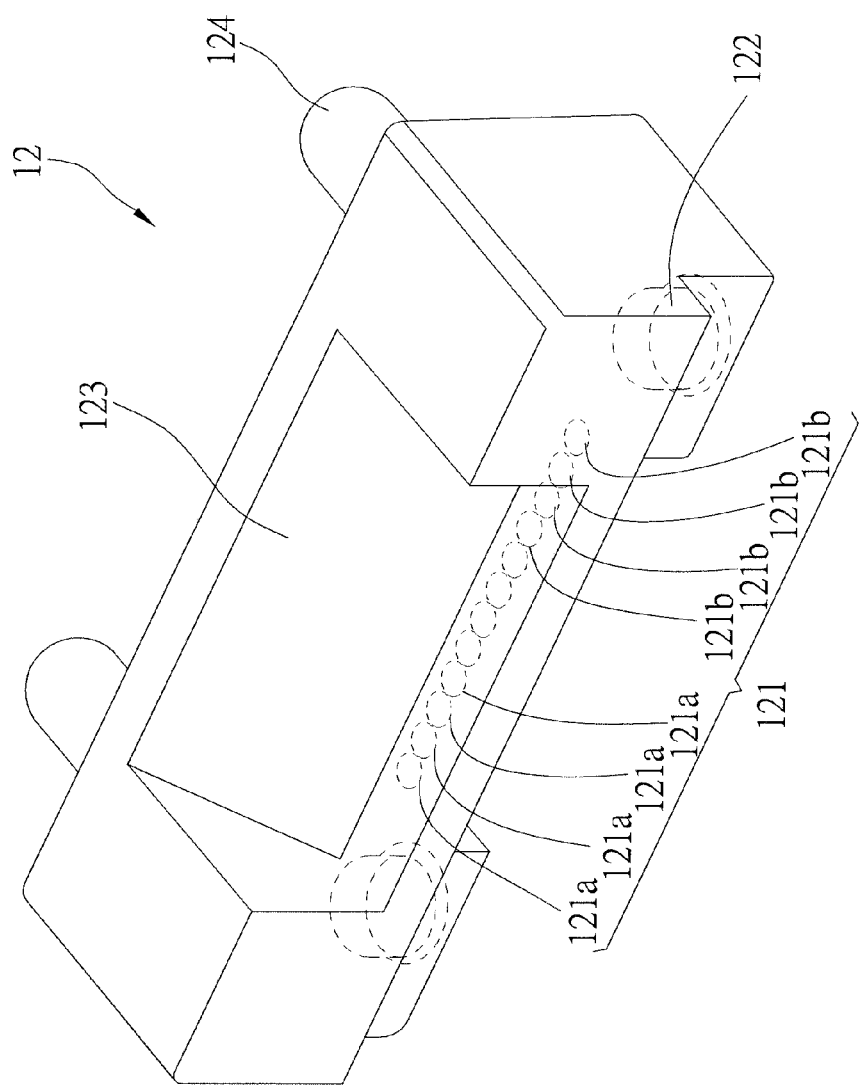
FIG. 3 is a perspective view of the main body of the preferred embodiment of the present invention.

As shown in FIG. 3, the main body 12 has a first lens portion 121, a first under positioning portion 122, and a reflective face 123. The first lens portion 121 has twelve aspheric lenses arranged in a line. The first four lenses from left are first input lenses 121a, and the first four lenses from right are first output lenses 121b. The first under positioning portion 122 and the first lens portion 121 are on the same surface. In the present embodiment, the positioning portion 122 has two holes at opposite sides of the first lens portion 121.

Figure 4:
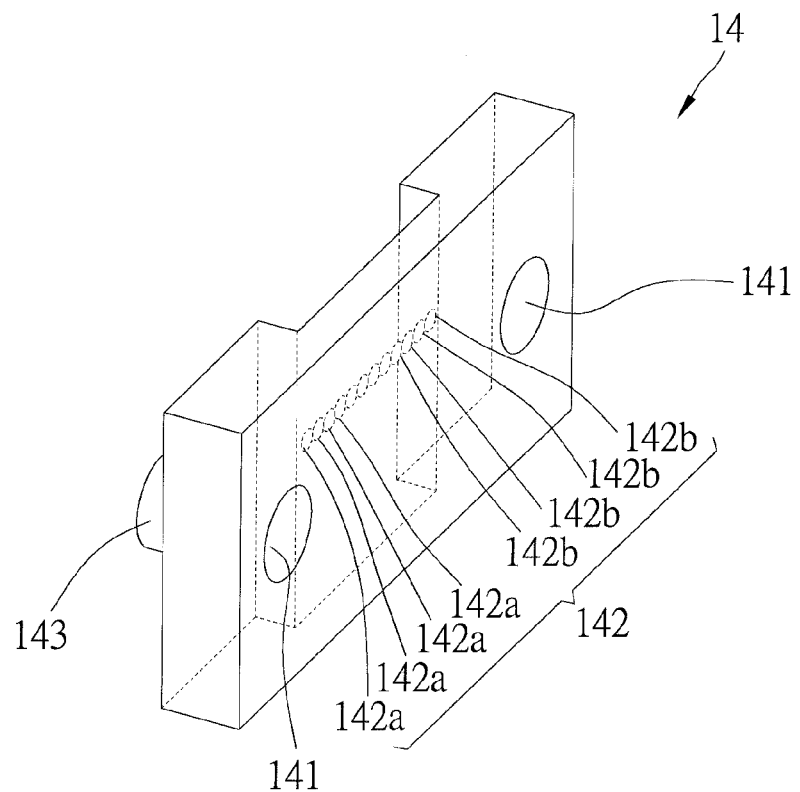
FIG. 4 is a perspective view of the lens frame of the preferred embodiment of the present invention.
Figure 5:
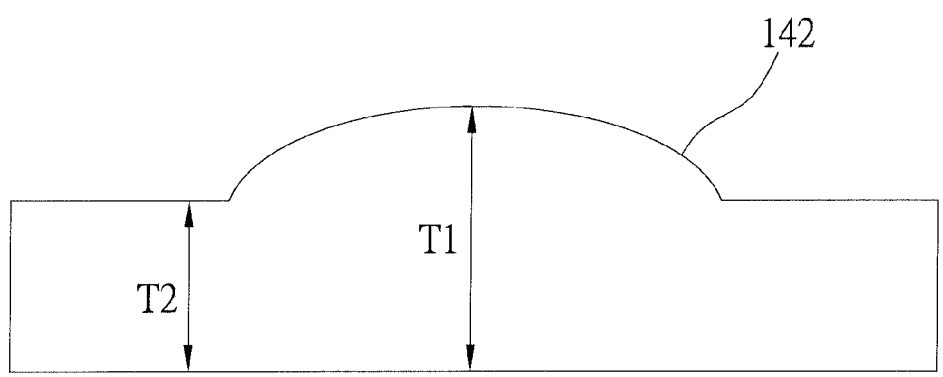
FIG. 5 is a sectional view of the lens of the preferred embodiment of the present invention, showing the central thickness and the edge thickness.
Figure 6:
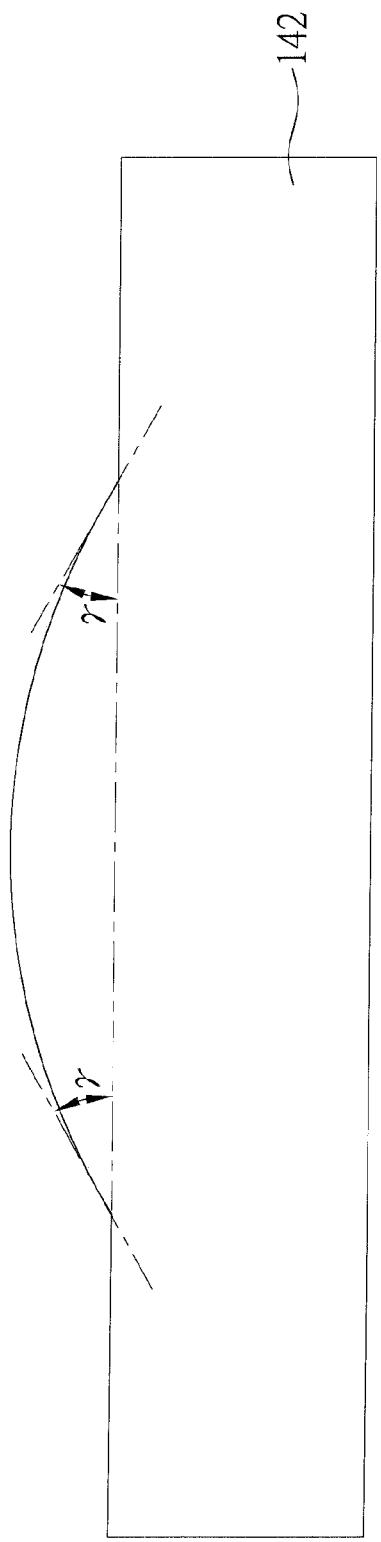
FIG. 6 is a sectional view of the lens of the preferred embodiment of the present invention, showing the tangent line at the edge of the lens.

As shown in FIG. 4, the lens frame 14 is detachably connected to the main body 12. In the present embodiment, the lens frame 12 has a first front positioning portion 141 at a side facing the main body 12, and the main body 12 has a second front positioning portion 124 in association with the first front positioning portion 141. The first front positioning portion 141 has two holes, and the second front positioning portion 124 has two protrusions, therefore the main body 12 is connected to the lens frame 14 through the engagement of the holes and the protrusions. The lens frame 14 further has a second lens portion 142, which has twelve aspheric lenses arranged in a line. The first four lenses from left are first output lenses 142a, and the first four lenses from right are first input lenses 142b. As shown in FIG. 5 and FIG. 6, the lenses satisfy the following conditions:

$$0.9 \leq \alpha \leq 1.2 \quad \quad 1)$$

$$28° \leq \gamma \leq 35° \quad \quad 2.)$$

where

α is a ratio of a central thickness T1 of the lens to an edge thickness T2 of the lens; and γ is an angle between a tangent line of an edge of the lens and the lens.

Figure 7:
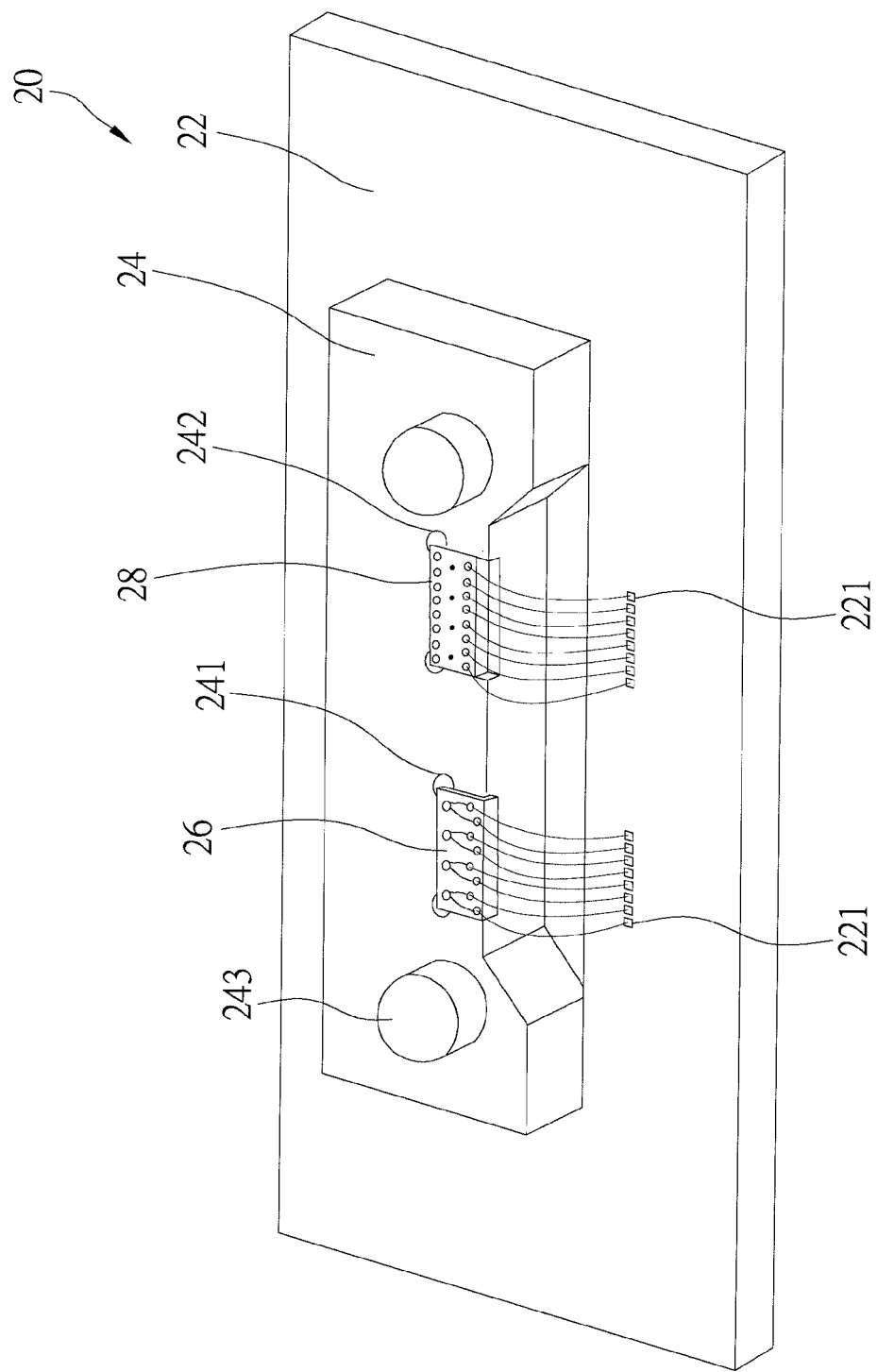
FIG. 7 is a perspective view of the optical-electrical converting module of the preferred embodiment of the present invention.

As shown in FIG. 7, the optical-electrical converting module 20 has a substrate 22, a base 24, an optical signal transmitter 26, and an optical signal receiver 28.

The substrate 22 is a printed circuit board (PCB) with a conductor pattern. The substrate 22 has several pads 221 electrically connected to the conductor pattern. In the present embodiment, the substrate 22 is a rigid-flex PCB, and the conductor pattern is embedded in the rigid-flex PCB.

Figure 8:
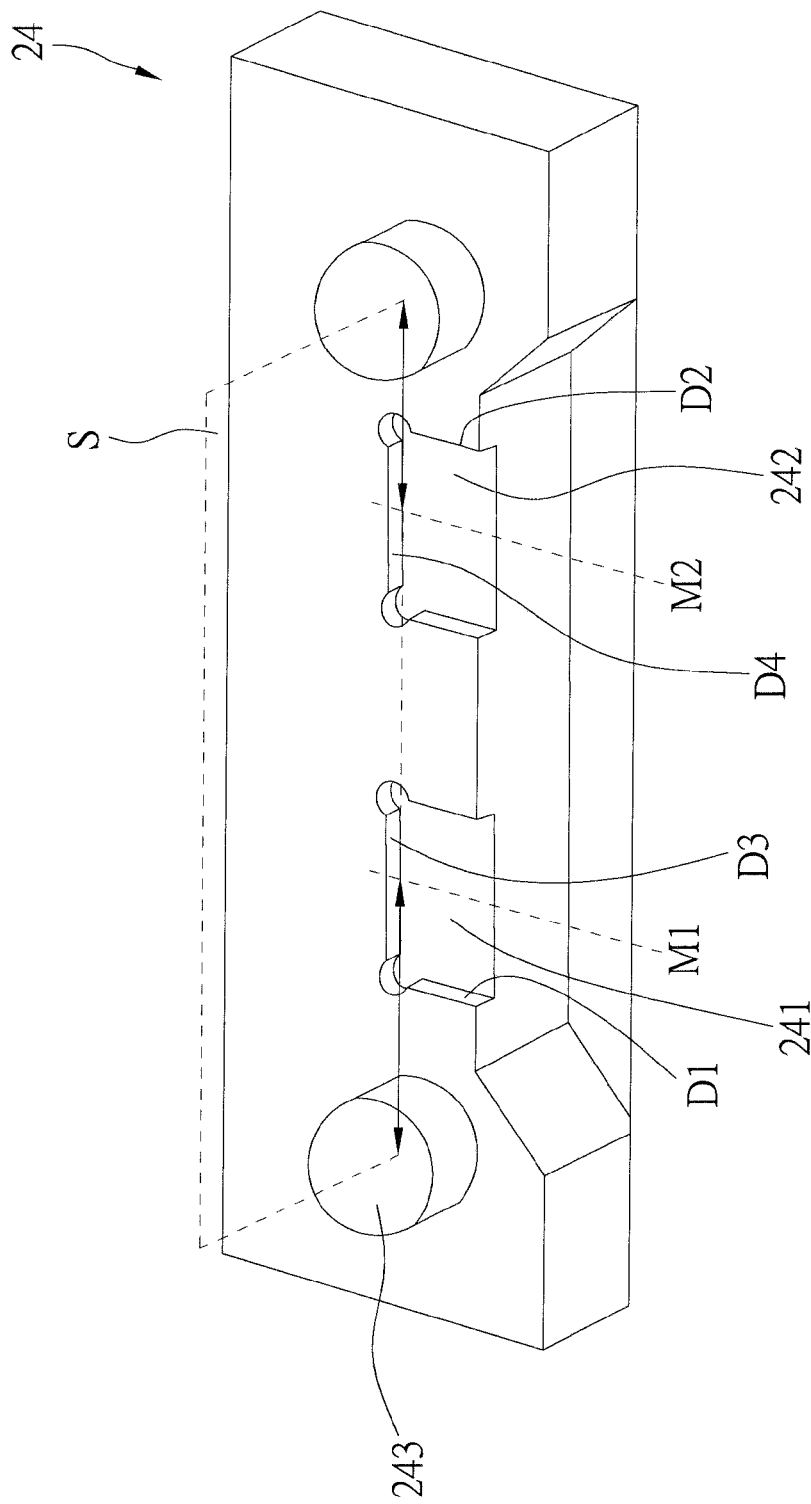
FIG. 8 is a perspective view of the base of the preferred embodiment of the present invention.

The base 24 is made of an insulating material, and is provided on the substrate 22. The base 24 has a first receiving hole 241, a second receiving hole 242, and a second under positioning portion 243. The first receiving hole 241 is in association with the first input lenses 121a, and the second receiving hole 242 is in association with the first output lenses 121b. The second under positioning portion 243 engages the first under positioning portion 122 of the optical coupling member 10. In the present embodiment, the second under positioning portion 243 has two protrusions, and the first and the second receiving holes 241, 242 are between the protrusions. The first under positioning portion 122 of the optical coupling member 10 has two holes complementary to the protrusions of the second under positioning portion 243. As shown in FIG. 8, a distance between a middle axis M1 of the first receiving hole 241 and a central axis of the adjacent protrusion 243 is equal to a distance between a middle axis M2 of the second receiving hole 242 and a central axis of the adjacent protrusion 243. Inner sidewalls D3, D4 of the first and the second receiving holes 241, 242 are on a plane S which contains the central axes of the protrusions 243.

The optical signal transmitter 26 has a plurality of light emitting portions and is received in the first receiving hole 241 and attached to a lateral sidewall D1, which connected to a left end of the inner sidewall D3, and the inner sidewall D3 of the first receiving hole 241. The light emitting portions respectively are in association with the first input lenses 121a. The optical signal transmitter 26 receives an electrical signal and converts it into an optical signal, and then transmits the optical signal to the optical coupling member 10 through the light emitting portions. In the present embodiment, the optical signal transmitter 26 is a vertical cavity surface emitting laser (VCSEL).

The optical signal receiver 28 has a plurality of light receiving portions. The optical signal receiver 28 is received in the second receiving hole 242 and attached to a lateral sidewall D2, which is connected to a right end of the inner sidewall D4, and the inner sidewall D4. In the present embodiment, the optical signal receiver 28 is a photodiode (PD).

Besides, the optical signal transmitter 26 is electrically connected to some of the pads 221 of the substrate 22, and the optical signal receiver 28 is electrically connected to the rest pads 221. Therefore, both the optical signal transmitter 26 and the optical signal receiver 28 are electrically connected to the conductor pattern of the substrate 22 through the pads 221.

The wire frame 30 is detachably connected to the lens frame 14 of the optical coupling member 10. In the present embodiment, the wire frame 30 has a third front positioning position 32 facing the lens frame 14, and the lens frame 14 has a fourth front positioning portion 143. The third front positioning position 32 has two holes, and the fourth front positioning portion 143 has two protrusions which are complementary to the holes, so that the wire frame 30 is connected to the lens frame 14 through the engagement of the holes and the protrusions of the third and the fourth front positioning portion 32, 143.

The optical fibers 40 are provided on the wire frame 30 and are beside the optical coupling member 10. Ends of the optical fibers 40 face the second lens portion 142. The first four optical fibers from left are first optical fibers 40a, and the first four optical fibers from right are second optical fibers 40b. The first optical fibers 40a are in association with the second output lenses 142*a* to receive the optical signals and transmit them out. The second optical fibers 40*b* are in association with the second input lenses 142*b* to receive the optical signals from outside and transmit them to the optical coupling member 10.

The engagements of the first under positioning portion 122 and the second under positioning portion 243, the first front positioning portion 141 and the second front positioning portion 124, and the third front positioning position 32 and fourth front positioning portion 143 will make the light emitting portions of the optical signal transmitter 26 are precisely aligned with the first input lenses 121*a*, the light receiving portions of the optical signal receiver 28 are precisely aligned with the first output lenses 121*b*, the first optical fibers 40*a* are precisely aligned with the first input lenses 142*a*, and the second optical fibers 40*b* are precisely aligned with the second input lenses 142*b*. Besides, the design of the inner sidewalls D3, D4 of the receiving holes 241, 242 on the plane S which contains the central axes of the protrusions of the second under positioning portion 243 and the same distances between the middle axis M1, M2 of the receiving holes 241, 242 and the corresponding central axes of the protrusion 243 may precisely position the optical signal transmitter 26 and the optical signal receiver 28 by receiving the optical signal transmitter 26 and the optical signal receiver 28 in the receiving holes 241, 242 and attaching them to the sidewalls D1, D2, D3, D4 respectively.

Figure 9:
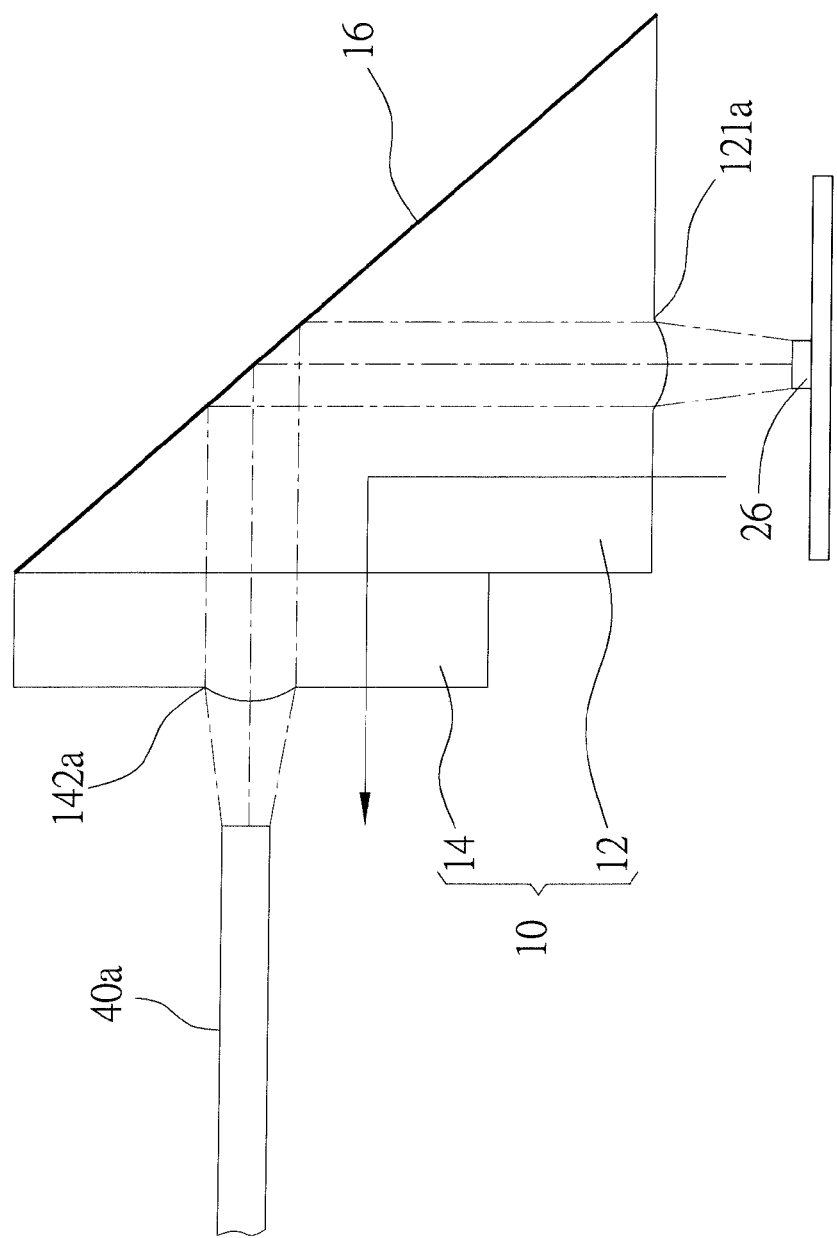
FIG. 9 and FIG. 10 show the light paths of optical signal of the preferred embodiment of the present invention.
Figure 10:
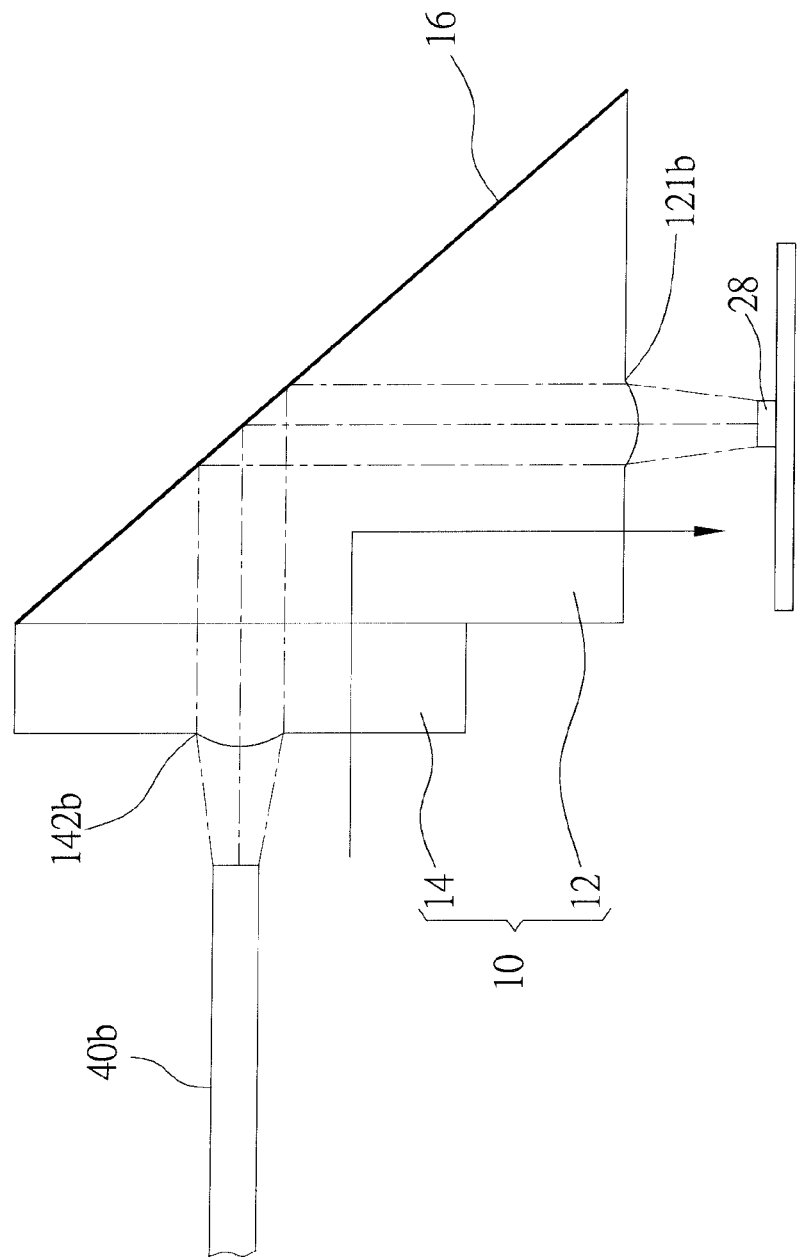

As shown in FIG. 9, after the optical signal transmitter 26 received an electrical signal, it will convert it into an optical signal accordingly and emit the optical signal to the optical coupling element 10. The optical signal transmits into the main body 12 of the optical coupling element 10 via the first input lens 121*a*, and is reflected by the reflective face 16 to leave the main body 12 and transmit into the lens frame 14. Next, the optical signal will leave the optical coupling element 10 via the second output lens 142*a* and emit to the first optical fiber 40*a* to transmit the optical signal out. On the contrary, as shown in FIG. 10, an optical signal from outside will be transmitted to the second optical fiber 40*b*, and then emit to the optical coupling element 10 through the second optical fiber 40*b*. At this moment, the optical signal transmits into the lens frame 14 and the main body 12 through the second input lens 142*b*, and then the optical signal is reflected by the reflective face 16. Next, the optical signal will leave the main body 12 via the first output lens 121*b* and transmit into the optical signal receiver 28 via the light receiving portion to convert the optical signal into an electrical signal accordingly.

In conclusion, the optical coupling device has both characters of small size and bi-directional transmission, and it also has the characters of fast optical alignment and precise optical positioning. Besides, with the design of the lenses of the second lens potion 142, it makes the optical coupling member 10 has a wide working range of the optical signal transmitter 26, shortens the time for optical alignment, and rises the precision of optical positioning. Besides, with the design of the detachable lens frame 14, it may increase the efficiency of the optical transmission and optical alignment, and furthermore it may be replaced by different materials, lenses of the lens frame with radius of curvature, the spherical lens, or the aspheric lens according to the numerical aperture of the optical fiber, condition of environment, system requirement, and the device for transmission to increase the function of optical transmission.

The description above is a few preferred embodiments of the present invention. Except for the optical-electrical converters of the optical signal receiver and the optical signal transmitter, it may use single optical-electrical converter for receiving and transmitting optical signals as well. The equivalence of the present invention is still in the scope of claim construction of the present invention.

What is claimed is:

1. An optical coupling device, comprising:
   an optical coupling member having at least a lens portion, a reflective face, and a first under positioning portion, wherein an optical signal transmits into the optical coupling member via the lens portion, and then is reflected by the reflective face to leave the optical coupling member, or an optical signal transmits into the optical coupling member, and then is reflected by the reflective face to leave the optical coupling member via the lens portion;
   an optical-electrical converting module, which is beside the optical coupling member, having a substrate, a base, and an optical-electrical converter, wherein the base is made of an insulating material and is provided on the substrate; the base has a receiving portion and a second under positioning portion; the optical-electrical converter is received in the receiving portion of the base to receive an electrical signal and convert the electrical signal into an optical signal, or receive an optical signal and convert the optical signal into an electrical signal, and the second under positioning portion engages the first under positioning portion of the optical coupling member to connect the optical-electrical converting module to the optical coupling member and make the optical-electrical converter face the optical coupling member;
   at least an optical fiber having an end facing the optical coupling member, wherein the optical coupling member is between the optical-electrical converting module and the optical fiber; the optical fiber transmits an optical signal from outside to the optical coupling member, or receives an optical signal from the optical coupling member and transmits the optical signal to outside; and
   the lens portion of the optical coupling member has a first lens portion and a second lens portion; the first lens portion is at a side of the optical coupling member which faces the optical-electrical converting module; the first under positioning portion and the first lens portion are on the same side; and the second lens portion is at a side of the optical coupling member which faces the optical fiber.

2. The optical coupling device as defined in claim 1, wherein the optical-electrical converter of the optical-electrical converting module has an optical signal transmitter; the optical signal transmitter has at least a light emitting portion; the optical signal transmitter receives the electrical signal and converts the electrical signal into the optical signal, and then emits the optical signal out via the light emitting portion.

3. The optical coupling device as defined in claim 2, wherein the optical-electrical converter of the optical-electrical converting module has and an optical signal receiver; the optical signal receiver has at least a light receiving portion; the optical signal receiver receives the optical signal via the light receiving portion, and then converts the optical signal into the electrical signal and transmits the electrical signal out.

4. The optical coupling device as defined in claim 3, wherein the optical fiber has at least a first optical fiber for receiving the optical signal from outside and transmitting the optical signal to the optical coupling member and at least a second optical fiber for receiving the optical signal from the optical coupling member and transmitting the optical signal to outside.

5. The optical coupling device as defined in claim 1, wherein the first under positioning portion has two holes at opposite sides of the first lens portion; the second under positioning portion has two protrusions, which are complementary to the holes, at opposite sides of the receiving portion to engage the holes.

6. The optical coupling device as defined in claim 5, wherein at least an inner sidewall of the receiving portion is on a plane which contains both central axes of the protrusions.

7. The optical coupling device as defined in claim 2, wherein the receiving portion of the base has a first receiving hole, in which the optical signal transmitter is received, and a second receiving hole in which the optical signal receiver is received.

8. The optical coupling device as defined in claim 7, wherein the first under positioning portion has two holes at opposite sides of the first lens portion; the second under positioning portion has two protrusions, which are complementary to the holes, at opposite sides of the receiving portion to engage the holes.

9. The optical coupling device as defined in claim 8, wherein a distance between a middle axis of the first receiving hole and a central axis of the adjacent protrusion is equal to a distance between a middle axis of the second receiving hole and a central axis of the adjacent protrusion.

10. The optical coupling device as defined in claim 1, wherein the substrate has a plurality of pads to be electrically connected to the optical-electrical converter.

11. The optical coupling device as defined in claim 1, wherein the substrate is a printed circuit board, on which a conductor pattern is provided, and the optical-electrical converter is electrically connected to the conductor pattern.

12. The optical coupling device as defined in claim 11, wherein the printed circuit board is a rigid-flex printed circuit board, and the conductor pattern is embedded in the rigid-flex printed circuit board.

13. The optical coupling device as defined in claim 1, wherein the optical-electrical converter of the optical-electrical converting module has and an optical signal receiver; the optical signal receiver has at least a light receiving portion; the optical signal receiver receives the optical signal via the light receiving portion, and then converts the optical signal into the electrical signal and transmits the electrical signal out.

14. The optical coupling device as defined in claim 13, wherein the optical fiber has at least a first optical fiber for receiving the optical signal from outside and transmitting the optical signal to the optical coupling member and at least a second optical fiber for receiving the optical signal from the optical coupling member and transmitting the optical signal to outside.

15. The optical coupling device as defined in claim 14, wherein both the light emitting portion of the optical signal transmitter and the light receiving portion of the optical signal receiver face the first lens portion when the second under positioning portion engages the first under positioning portion.

\* \* \* \* \*